April 20, 1937. R. JENSEN 2,077,416
AUTO GAUGE
Filed Oct. 25, 1933 3 Sheets-Sheet 1

Inventor
Robert Jensen,
By Clarence A. O'Brien
Attorney

April 20, 1937.  R. JENSEN  2,077,416
AUTO GAUGE
Filed Oct. 25, 1933   3 Sheets-Sheet 2

Inventor
Robert Jensen,

By *Clarence A O'Brien*
Attorney

April 20, 1937.   R. JENSEN   2,077,416
AUTO GAUGE
Filed Oct. 25, 1933   3 Sheets-Sheet 3

Inventor
*Robert Jensen,*

By *Clarence A. O'Brien,*
Attorney

Patented Apr. 20, 1937

2,077,416

UNITED STATES PATENT OFFICE 2,077,416

AUTO GAUGE

Robert Jensen, Sioux City, Iowa

Application October 25, 1933, Serial No. 695,171

1 Claim. (Cl. 177—311)

This invention has reference to a gauge particularly adapted for use on automobiles whereby the operator may readily determine the condition of the tire and the balance of equilibrium of the vehicle itself.

Briefly the invention consists in the provision of an electrical gauge that may be readily mounted on the instrument board of the vehicle in sight of the operator and means for operating the gauge including pendulum equipped devices mounted on the front and rear axle and in electrical connection with the first named instrument in a manner to operate the latter, so that by reading the first named instrument the operator may readily determine the fact that a particular tire is under inflated, the pendulum equipped devices being controlled by the equilibrium of the automobile.

The invention together with its objects and advantages will be best understood from a study of the following description taken in connection with the accompanying drawings, wherein.

Figure 5:
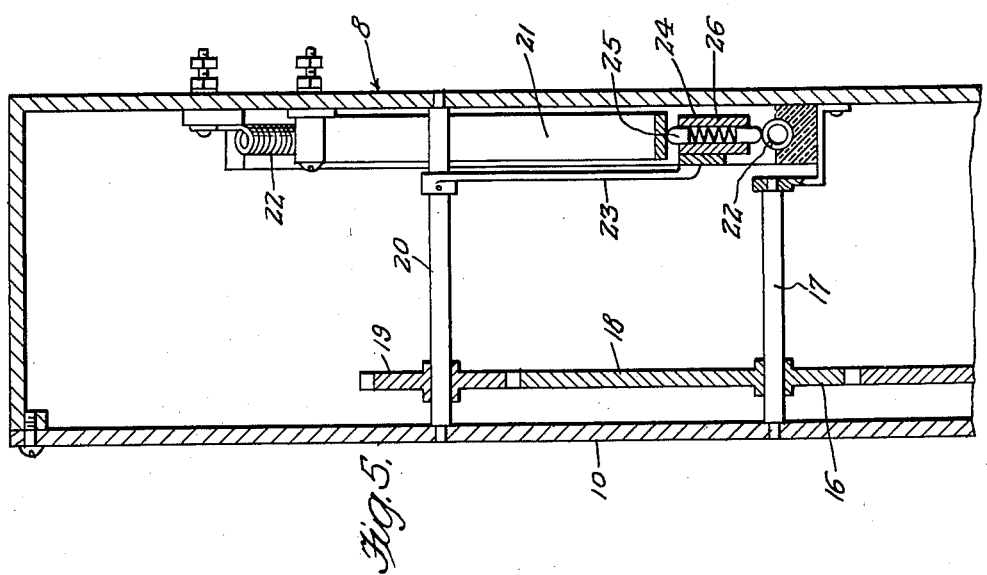
Figure 5 is a vertical sectional view through said device, and taken on an enlarged scale.
Figure 6:
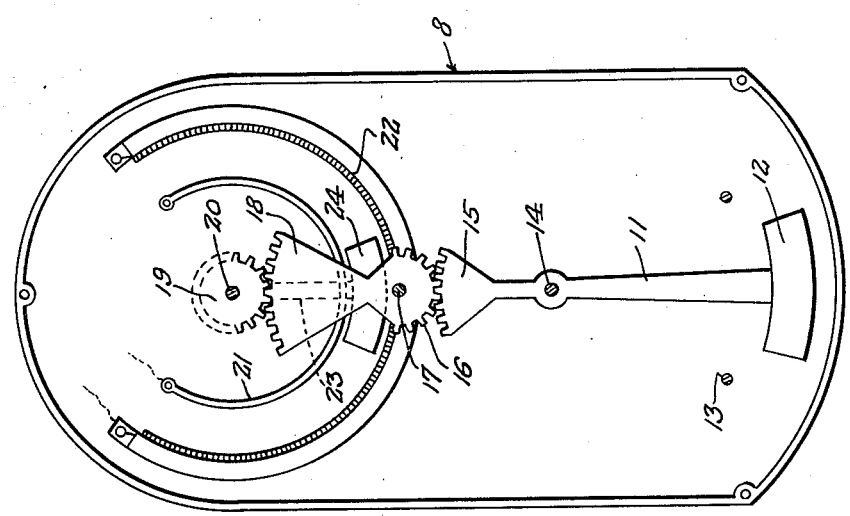
Figure 6 is an elevational view, with the cover plate of the casing of the pendulum equipped device removed.
Figure 7:
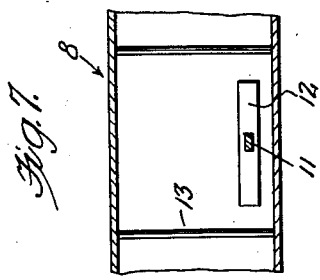
Figure 7 is a fragmentary sectional view showig the location of the stop at opposite sides of the pendulum.

Referring to the drawings by reference numerals it will be seen that the front axle of the vehicle is indicated by the reference numeral 5 and the rear axle by the reference numeral 6. On each of the axles there is mounted a control device indicated generally by the reference numeral 7. Each of the devices 7 includes a suitable casing 8 that is secured to an axle through the medium of a suitable clamp 9. A cover plate 10 is provided for the casing as shown in Figure 5. Arranged within the casing 8 is a pendulum 11 that has a weight 12 on its lower end. The pendulum 11 is arranged to swing between stops 13 that extend between opposed walls of the casing. The pendulum 11 is also mounted within the casing to swing on a suitably mounted fixed shaft 14 and above the pivot 14 is provided with a tooth segment 15 that is in mesh with a rack 16 fixed to a shaft 17 that is suitably journalled in the casing 8. Integral with the rack 16 is a quadrant 18 that is in mesh with a gear 19 secured to a shaft 20 that is also journalled in the casing 8 for rotative movement.

Figure 1:
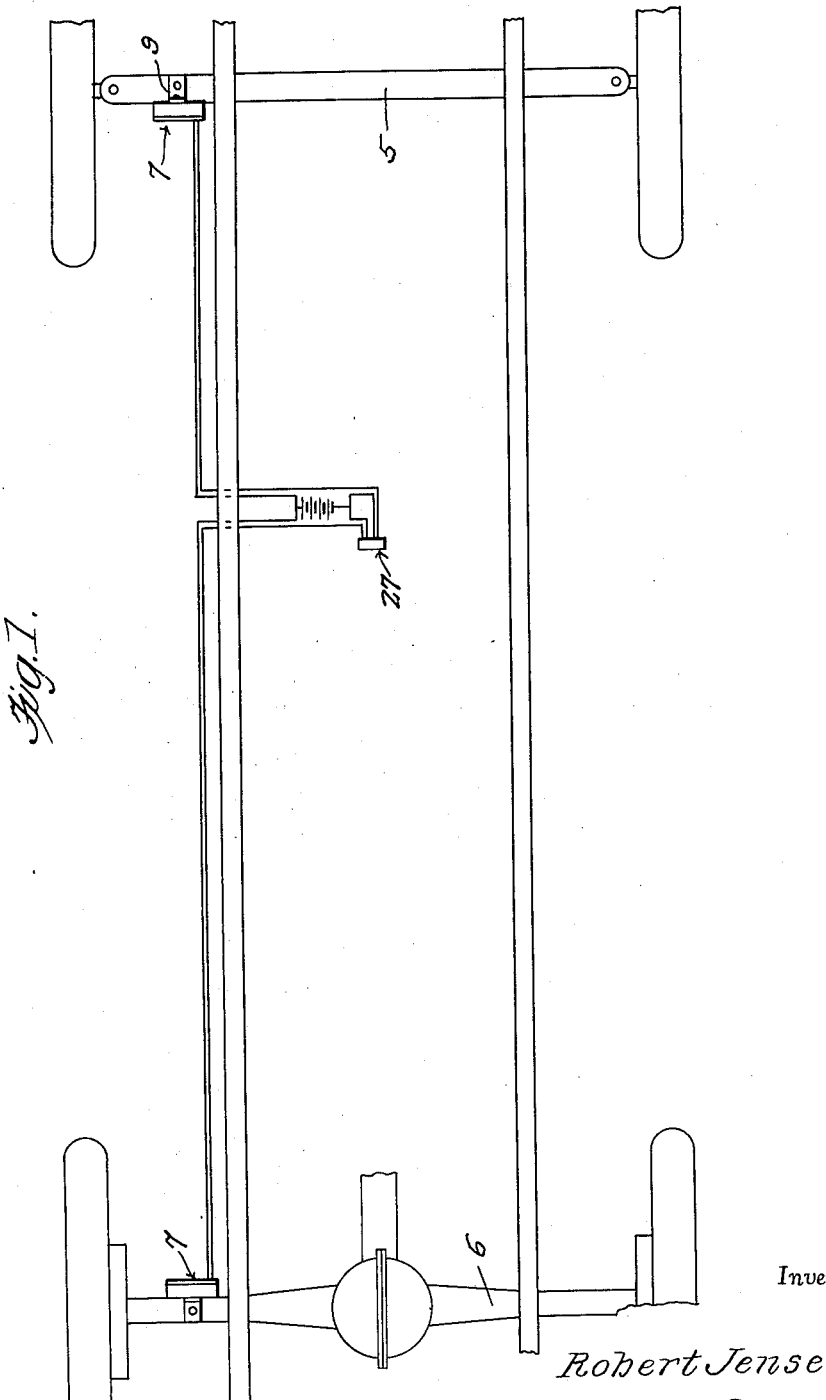
Figure 1 is a top plan view illustrating the application of the invention.

A split conductor ring 21 is mounted on the rear wall of the casing 8 substantially concentric to the shaft 20, and disposed exteriorly of and concentric to the ring 21 is a potentiometer wound strip 22. Secured to the shaft 20 to rotate with the shaft is an arm 23 that is provided with a block 24 which operates in the space between the conductor strip 21 and the wound strip 22. Slidably mounted in the block 24 are contact plungers 25 that are normally urged outwardly and into engagement with the strips 21, 22 through the medium of a coil spring 26. Suitably mounted on the instrument board of the automobile is an electrical gauge indicated generally by the reference numeral 27. The gauge 27 includes among other parts a suitable casing 28 having in the front thereof a sight window 29. Arranged within the casing 28 and forming part of the gauge are two suitably mounted pointers 30, 31 supported for coaxial movement, and each of which is operated in a well known manner by a coil 34, and the coils of the gauge as well as the strips 21, 22 are arranged in a suitable battery circuit as will be clear from a study of Figure 1.

Figure 2:
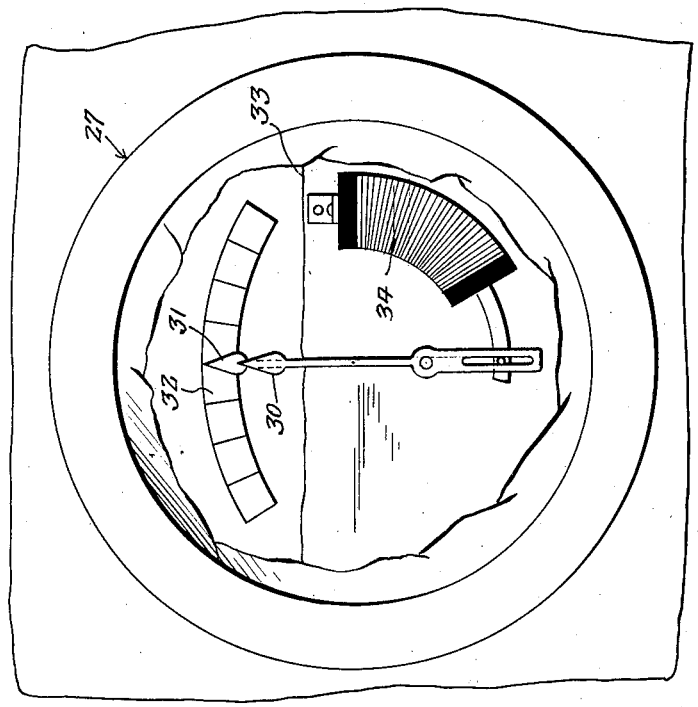
Figure 2 is a front elevational view of the gauge with parts broken away.
Figure 3:
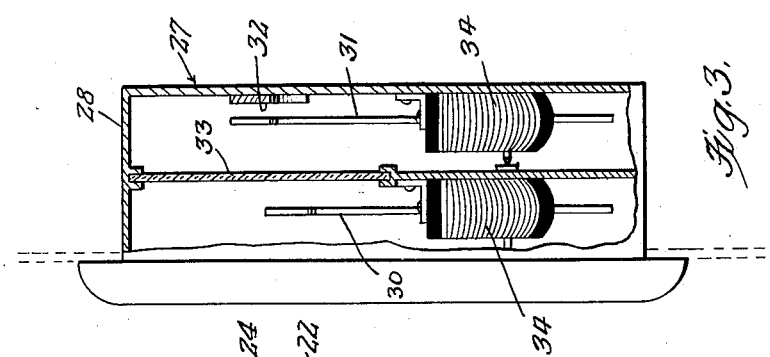
Figure 3 is a side view of the gauge, certain parts being broken away and shown in section.
Figure 4:
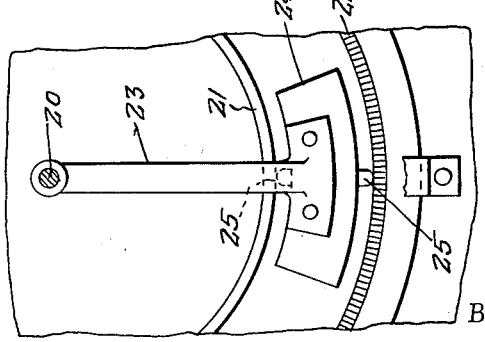
Figure 4 is a fragmentary sectional view through one of the pendulum equipped devices for controlling the gauge.

As will be clear from a study of Figures 2 and 3 the pointers 30, 31 are readable against a suitably graduated scale 32 mounted internally of the casing 28 on the rear wall of the casing. One of the pointers, as for example, the pointer 30 is controlled by the device 7 on the front axle 5, while the other of the pointers, in this instance the pointer 31 is controlled by the pendulum device 7 on the rear axle 6, through the electrical circuit and coils hereinbefore referred to. To facilitate the reading thereof the front pointer 31 terminates below the upper end of the pointer 30, and arranged between the pointers 30, 31 is a suitable transparency 33.

It is to be understood that the instrument for the instrument board simply consists of a pair of ammeters one placed upon the other with both needles properly centered on the properly marked dial so that they will swing right or left as current passes through the coils thereof.

From the above it will be apparent that should for example, one of the tires on a front wheel of the vehicle become under inflated the vehicle will lose its equilibrium and the pointer 30 will be caused to swing in the proper direction across the scale 32; this being apparent from the fact that when the vehicle becomes unbalanced due to the under inflating of the tire at the front of the vehicle the pendulum 11 of the device 7 mounted on the front axle 5 will swing in the proper direction and through the intermeshing of the parts 15, 16, 18 and 19 the motion of the pendulum will be transmitted to the arm 23 causing the plungers 25 to move over the strips 21, 22, while the wiping engagement with said strips for increasing the potential of the proper one of the coils of the gauge 27 forming part of the electrical actuating means for the referred to pointer 30.

Obviously should a tire on one of the rear wheels of the vehicle blow out, or otherwise become under inflated the operation will be substantially the same, and the fact of this under inflation can be readily ascertained by the operator by reading the pointer 31 against the scale 32.

Thus with a device of this character the operator of the vehicle will be able to readily ascertain which of the tires of the vehicle has become under inflated without leaving his position in the automobile.

It will, of course, be understood that if the vehicle on which the device is mounted is running on one side of a crowned road, both pointers will move the same distance together. If the vehicle on which the device is mounted is running on one side of a crowned road and a tire becomes deflated, both pointers will be moved from normal but one will move from normal a different amount than the other and thus show that the tire of one wheel is deflated.

Having thus described my invention, what I claim as new is:

The combination of front and rear axles of an automobile, a pair of pendulums, means for mounting one of the pendulums on each of the axles, a pair of resistance elements, means for mounting one of the resistance elements rigidly with each of the axles, a contact device engaging each of the resistance elements, means connecting each pendulum with the corresponding contact device to move the contact device to vary the resistance as the pendulum moves relative to the axle upon tilting of the axle from its normal horizontal position, an indicating device, comprising a pair of pointers, means for mounting the pointers for co-axial movement, electrical means for moving each of the pointers a distance depending upon the current flowing through the electrical means, a battery, and circuit means for connecting each of the contacts and resistance elements with one of the electrical means and the battery.

ROBERT JENSEN.